United States Patent [19]

Fusco

[11] 4,000,069

[45] Dec. 28, 1976

[54] METHOD FOR PURIFYING WASTE WATERS WHICH CONTAIN ANIONIC-TYPE ORGANIC COMPOUNDS

[75] Inventor: Raffaello Fusco, Milan, Italy

[73] Assignee: Anic S.p.A., Palermo, Italy

[22] Filed: Feb. 3, 1976

[21] Appl. No.: 654,791

[30] Foreign Application Priority Data

Feb. 3, 1975 Italy .................................. 19914/75

[52] U.S. Cl. ..................................... 210/54; 8/81
[51] Int. Cl.² ......................... C02B 1/20; C02C 5/02
[58] Field of Search .................... 210/42, 47, 54; 260/387, 606.5 F; 8/81

[56] References Cited

UNITED STATES PATENTS

| | | | |
|---|---|---|---|
| 3,303,220 | 2/1967 | Matthews et al. | 260/606 SF |
| 3,389,081 | 6/1968 | Eckenfelder et al. | 210/54 |
| 3,531,514 | 9/1970 | Redmore | 260/606 SF |
| 3,875,111 | 4/1975 | Tsuda et al. | 210/54 |

*Primary Examiner*—Thomas G. Wyse
*Attorney, Agent, or Firm*—Ralph M. Watson

[57] ABSTRACT

In waste-water-treatment, the improvement consisting in causing the precipitation of anionic pollutants by adding to the sewage an aqueous solution of a bis-triarylphosphonium salt. A number of different chemical formulas for such salts are disclosed. It becomes possible to recover dyestuffs from dyeing baths in the textile industries, while solving a severe pollution-preventing problem.

2 Claims, No Drawings

METHOD FOR PURIFYING WASTE WATERS WHICH CONTAIN ANIONIC-TYPE ORGANIC COMPOUNDS

This invention relates to a method for the purification of waste water which contains organic compounds of an anionic nature, said method exploiting bis-triarylphosphonium salts.

It is known that the organic substances of the kind referred to above as dissolved in sewage can be removed with difficulty by the conventional treatments.

It has now been surprisingly detected, and this is the subject-matter of the present invention, that with the use of salts of bis-triarylphosphonium saline compounds are formed, which are very poorly soluble, with organic compounds of an anionic nature, the latter being thus quickly precipitated. More particularly, the salts in question supply very poorly soluble saline compounds with numerous classes of dyes, provided that the latter possess one or more sulphone groups in their molecules. This property can be exploited, for example, to precipitate, and thus to strip, said dyes from the residual dyeing baths, especially when the dyestuffs in question cannot be stripped with the conventional organic precipitants (such as calcium hydroxide and aluminium sulphate) or concurrently with the above indicated organic precipitants, so as considerably to reduce the consumption and thus the volume of the obtained sludges. Another interesting feature of the compounds of the present invention consists in supplying highly water-insoluble saline compounds which many anionic capillary active compounds which are available in the trade, such as alkylbenzene sulphates, both of the straight-chain and the branched-chain kind. Also this important property can be exploited to remove, in an insoluble form, residues of such capillary-active substances, as present in water and which, as is well known, are difficult to remove by biological degradation or otherwise.

Bis-triarylphosphonium salts which can be used according to the present invention have the formula:

$$Ar_3 P^+ - A - P^+ Ar_3 \cdot 2 X^-$$

wherein Ar is a substituted or unsubstituted phenyl group or an alpha- or a beta-naphthyl group; $X^-$ is the anion of an inorganic or organic acid; A is a bifunctional radical deriving from an aromatic or an arylaliphatic hydrocarbon, or is a bivalent radical selected among the following:

1. $-(CH_2)_n-CO-NH-B-NH-CO(CH_2)_n-$; wherein $n$ is a number comprised between 1 and 4 and B is a bivalent residue deriving from an aliphatic hydrocarbon having either a straight or a branched chain, from an aromatic or an arylaliphatic hydrocarbon, or A is a bivalent radical having the structure:
2. $-(CH_2)_n-O-CO-NH-B-NH-CO-O-(CH_2)_n-$ wherein $n$ is a number comprised between 2 and 6 and B is a bivalent residue as defined above; or A is a bivalent radical having the structure:
3. $-(CH_2)_n-O-CO-B-CO-O-(CH_2)_n-$ wherein $n$ and B have the meaning defined at (2) above; or A is a bivalent radical having the structure:
4. $-(CH_2)_n-CO-O-B-O-CO-(CH_2)_n-$ wherein $n$ is a number comprised between 1 and 6 and B is a bivalent residue as defined above.

The method according to the present invention comprises the step of adding to the sewage an aqueous solution of a salt as defined above. The quantity of the salt is not critical and is selected as a function of the quantity of polluting substances.

Quantities of salts below the stoichiometrical amount can be used, as well as quantities above said level, especially ratios of the salt to the pollutant from 0.5 to 2 with respect to the stoichiometrical amount, even though considerably larger amounts do not prejudice the results. The top limit is suggested by merely economical considerations. An additional advantage of the present invention is the possibility of recovering the dyestuffs, which had been dissolved, in the form of pigments and these latter can further be used. The working procedures will become clearer by scrutinizing the ensuing illustrative examples which, however, are not to be construed as limitations to the invention.

EXAMPLE 1

An aqueous solution containing 200 ppm of the ACID BLUE 45 (Color Index) dyestuff is supplemented, with stirring, with an aqueous solution of the bis-triphenylphosphonium salt of 1,5-bis-chloro-methyl-2,4-dimethylbenzene, until a portion of the filtered solution does no longer precipitate by addition of further amounts of the salt. The quantity of the salts which is required is one gram per each gram of dyestuff. A virtually integral precipitation of the dyestuff is experienced. The filtrate, from which the precipitate has been stripped, diluted 20 times with water and observed through a 10-cm thick layer is perfectly colourless.

EXAMPLE 2

An aqueous solution of 200 ppm of sodium dodecylbenzene sulphonate is supplemented, with stirring, with an aqueous solution of the bis-triphenylphosphonium salt of bis-chloroacetyl-hexamethylene diamine until a portion of aluminium filtered solution is deprived of the capillary-active substance (Methyl Blue test). To the suspension thus obtained a solution of aluminum sulphate is added and, if necessary, the pH of the solution is adjusted to a value of about 8 with calcium hydroxide. Under these conditions the precipitate can readily be stripped by filtration or decantation and the supernatant liquor is clear and exempt from capillary active substances. For each gram of capillary active substance one gram of phosphonium salt and one gram of aluminum sulphate are employed.

EXAMPLE 3

4,000 liters of waste water from a dyeing and washing bath containing 1.26 kilograms of Procyon Orange MX2R, 1.11 kilograms of Lavafix Yellow EG, 0.09 kilograms of Lavafix Red E 4D, 1 kilogram of a nonionic capillary-active substance, 1 kilogram of sulphonate lauryl alcohol, 80 kilograms of $Na_2SO_4$ and 21 kilograms of $Na_2CO_3$ are supplemented with a solution of 5.5 kilograms of triphenylphosphonium salt as used in Example 2. There are also added 5 kilograms of $Al_2(SO_4)_3 \cdot 18 H_2O$ and the pH is adjusted with an inorganic acid between 7 and 8. Decantation is allowed to take place during 30 mins. A sample of supernatant liquor, diluted with water to 1 : 20 and looked through at a thickness of 10 centimeters is colourless.

What I claim is:

1. A method for the purification of waste waters which contain organic compounds of an anionic nature comprising the steps of adding to said waters aqueous solutions of bis-triarylphosphonium salts.

2. A method for the purification of waste waters according to claim 1, characterized in that the salts of bis-triarylphosphonium have the following formula:

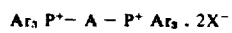

wherein Ar is an unsubstituted or substituted phenyl group, or an alpha- or beta naphthyl group; $X^-$ is the anion of an inorganic or an organic acid; A is a bifunctional radical deriving from an aliphatic hydrocarbon having a straight or a branched chain, or from an aromatic or an arylaliphatic hydrocarbon; or it is a bivalent radical selected among the following:

1. $-(CH_2)_n-CO-NH-B-NH-CO-(CH_2)_n-$ wherein $n$ is a number comprised between 1 and 4 and B is a bivalent residue deriving from an aliphatic hydrocarbon having either a straight of a branched chain, or an aromatic or an arylaliphatic hydrocarbon; or A is a bivalent radical having the structure:
2. $-(CH_2)_n-O-CO-NH-B-NH-CO-O-(CH_2)_n-$ wherein $n$ is a number comprised between 2 and 6 and B is a bivalent residue as defined hereinabove; or A is a bivalent radical having the structure:
3. $-(CH_2)_n-O-CO-B-CO-O-(CH_2)_n-$ wherein $n$ and B have the same meanings as specified at (2) above, or A is a bivalent radical having the structure:
4. $-(CH_2)_n-CO-O-B-O-CO-(CH_2)_n-$ wherein $n$ is a number comprised between 1 and 6 and B is a bivalent residue as defined hereinabove.

* * * * *

UNITED STATES PATENT AND TRADEMARK OFFICE
CERTIFICATE OF CORRECTION

PATENT NO. : 4,000,069
DATED : December 28, 1976
INVENTOR(S) : Raffaello Fusco

It is certified that error appears in the above-identified patent and that said Letters Patent are hereby corrected as shown below:

Column 1, line 32, After "compounds" correct "which" to read --with--.

Column 2, line 39, After "of" (first occurrence) insert --the-- and delete "aluminium".

Signed and Sealed this

Thirty-first Day of May 1977

[SEAL]

Attest:

RUTH C. MASON
Attesting Officer

C. MARSHALL DANN
Commissioner of Patents and Trademarks